(12) United States Patent
Mathiesen et al.

(10) Patent No.: US 8,517,099 B2
(45) Date of Patent: Aug. 27, 2013

(54) TUBULAR MEMBER HAVING SELF-ADJUSTING VALVES CONTROLLING THE FLOW OF FLUID INTO OR OUT OF THE TUBULAR MEMBER

(75) Inventors: Vidar Mathiesen, Porsgrunn (NO); Haavard Aakre, Skien (NO)

(73) Assignee: Statoil Asa, Stavanger (NO)

( * ) Notice: Subject to any disclaimer, the term of this patent is extended or adjusted under 35 U.S.C. 154(b) by 268 days.

(21) Appl. No.: 12/920,020

(22) PCT Filed: Jan. 14, 2009

(86) PCT No.: PCT/NO2009/000018
§ 371 (c)(1),
(2), (4) Date: Nov. 23, 2010

(87) PCT Pub. No.: WO2009/108059
PCT Pub. Date: Sep. 3, 2009

(65) Prior Publication Data
US 2011/0056578 A1      Mar. 10, 2011

(30) Foreign Application Priority Data
Feb. 29, 2008   (NO) .................................... 20081078

(51) Int. Cl.
    *E21B 43/00*          (2006.01)
(52) U.S. Cl.
    USPC ............................ 166/263; 166/319; 166/320
(58) Field of Classification Search
    USPC ............................ 166/250.15, 319, 320, 263
    See application file for complete search history.

(56) References Cited

U.S. PATENT DOCUMENTS

| 4,577,691 A | 3/1986 | Huang et al. |
| 4,821,801 A | 4/1989 | Van Laar |
| 4,858,691 A | 8/1989 | Ilfrey et al. |
| 6,112,817 A | 9/2000 | Voll et al. |
| 2006/0027377 A1* | 2/2006 | Schoonderbeek et al. ..... 166/386 |
| 2008/0041580 A1 | 2/2008 | Freyer et al. |

FOREIGN PATENT DOCUMENTS

| GB | 2 169 018 A | 7/1986 |
| WO | WO 92/08875 A2 | 5/1992 |
| WO | WO 2008/004875 A1 | 1/2008 |

OTHER PUBLICATIONS

White et al., "Controlling flow in horizontal wells," World Oil, Nov. 1991, pp. 73-80.

* cited by examiner

*Primary Examiner* — David Bagnell
*Assistant Examiner* — Taras P Bemko
(74) *Attorney, Agent, or Firm* — Birch, Stewart, Kolasch & Birch, LLP

(57) ABSTRACT

A tubular member having at least one drainage section (1) including a first plurality of self-adjustable valves or flow control devices (2) to control the flow of fluid into the drainage section from a well formed in a subterranean reservoir, each of the valves (2) comprising an inlet or aperture (10), thereby forming a flow path (11) through the control device (2) passing by a movable disc or body (9) designed to move freely relative to the opening of the inlet and thereby reduce or increase the flow-through area (A2) by exploiting the Bernoulli effect and any stagnation pressure created over the disc (9), whereby the valve (2), depending on the composition of the fluid and its properties, autonomously adjusts the flow of the fluid based on a pre-estimated flow design. To allow injection of fluid into the subterranean reservoir, the drainage section (1) is provided with a second plurality of such self-adjustable valves (32), each being situated in a direction opposite of the first plurality.

18 Claims, 8 Drawing Sheets

TUBULAR MEMBER HAVING SELF-ADJUSTING VALVES CONTROLLING THE FLOW OF FLUID INTO OR OUT OF THE TUBULAR MEMBER

The present invention relates to a tubular member having valves or flow control devices for self-adjusting (autonomously adjusting) the flow of fluid into or out of the tubular member, e.g. when but not exclusively producing oil and/or gas from a well in an oil and/or gas reservoir, which tubular member includes at least one drainage section which by means such valves or flow control devices communicates the geological production formation with the flow space of the drainage pipe.

Devices for recovering of oil and gas from long, horizontal and/or vertical wells are known from U.S. patent publications Nos. 4,821,801, 4,858,691, 4,577,691 and GB patent publication No. 2169018. These known devices comprise a perforated drainage pipe with, for example, a filter for control of sand around the pipe. A considerable disadvantage with the known devices for oil and/or gas production in highly permeable geological formations is that the pressure in the drainage pipe increases exponentially in the upstream direction as a result of the flow friction in the pipe. Because the differential pressure between the reservoir and the drainage pipe will decrease upstream as a result, the quantity of oil and/or gas flowing from the reservoir into the drainage pipe will decrease correspondingly. Therefore, the total oil and/or gas produced by this means will be low. With thin oil zones and highly permeable geological formations, there is further a high risk of coning, i.e. flow of unwanted water or gas into the drainage pipe downstream, where the velocity of the oil flow from the reservoir to the pipe is the greatest.

From World Oil, vol. 212, N. 11 (11/91), see pages 73-80, it is previously known to divide a drainage pipe into sections with one or more inflow restriction devices such as sliding sleeves or throttling devices. However, this reference is mainly dealing with the use of flow control to limit the inflow rate for uphole zones and thereby avoid or reduce coning of water and/or gas.

WO-A-9208875 describes a horizontal production pipe comprising a plurality of production sections connected by mixing chambers having a larger internal diameter than the production sections. The production sections comprise an external slotted liner which can be considered as performing a filtering action. However, the sequence of sections of different diameter creates flow turbulence and prevent the running of work-over tools.

When extracting oil and or gas from geological production formations, fluids of different qualities i.e. oil, gas, water (and sand) is produced in different amounts and mixtures depending on the property or quality of the formation. None of the above-mentioned, known devices are able to distinguish between and control the inflow of oil, gas or water on the basis of their relative composition and/or quality.

WO-A1-2008/004875 discloses an valve or flow control device being autonomous or self-adjusting to control the inflow into a production pipe from the formation in a very simple and practical manner. The valve or device is designed to "distinguish" between the oil and/or gas and/or water and is able to control the inflow of oil, gas or water, depending on which of these fluids such flow control is required. Other advantages by using such a valve or flow control device are the robust construction thereof, the ability to withstand large forces and high temperatures, to prevent draw dawns (differential pressure), to withstand sand production, no energy supply is needed, and the reliability despite of the simplicity and low costs during manufacturing.

To increase oil and gas recovery (IOGR) and/or for enhanced oil and gas recovery (EOGR), prior art technology proposes the use of injector wells in oil reservoirs. Injectors can be used to inject e.g. water, steam, hydrocarbon gas and/or $CO_2$. The injector wells can have different orientation and extent. In many situations the injected fluid should be evenly distributed in the reservoir. In these cases long injection wells are used, and the injected fluids are injected in different sections along the well.

When injecting fluid in different sections along a well the injection will be non-uniform, see FIG. 10. This is mainly caused by the non-uniform reservoir which can include e.g. high and low permeable zones, fractures and short-cuts. The nature of all fluid flow is that the fluid will flow where the resistance is smallest. This fact ensures that the injections will, most often, be very non-uniform. This result in poor utilization of injected fluid and low IOGR/EOGR effect.

A main object of the present invention is to eliminate the need of separate injector wells by utilizing the valves or flow control devices according to WO-A1-2008/004875.

This object is achieved by a tubular member having at least one drainage section including a first plurality of self-adjustable valves or flow control devices to control the flow of fluid into the drainage section from a well formed in a subterranean reservoir, each of the valves or control devices comprising an inlet or aperture, thereby forming a flow path through the valve or control device passing by a movable disc or body which is designed to move freely relative to the opening of the inlet and thereby reduce or increase the flow-through area by exploiting the Bernoulli effect and any stagnation pressure created over the disc, whereby the valve or control device, depending on the composition of the fluid and its properties, autonomously adjusts the flow of the fluid based on a pre-estimated flow design, characterized in that a second plurality of such self-adjustable valves or control devices is provided in the drainage section, each such additional valves or control devices being situated in a direction opposite of the first plurality, thereby allowing injection of a fluid into the subterranean reservoir through the drainage section.

By situating the first and second plurality of such valves or control devices in opposite directions through the drainage section or sections, the tubular member can be utilizes as a producer or injector, respectively. Advantageous embodiments are specified in the dependent claims below.

The present invention will be further described in the following by means of preferred embodiments illustrated in the drawings, in which:

FIG. 1 shows a schematic view of a production pipe with a control device according to WO-A1-2008/004875;

FIG. 2*a-b* shows in larger scale a cross section along section A-A and a top view of the control device according to FIG. 1, respectively;

Figure 9A:
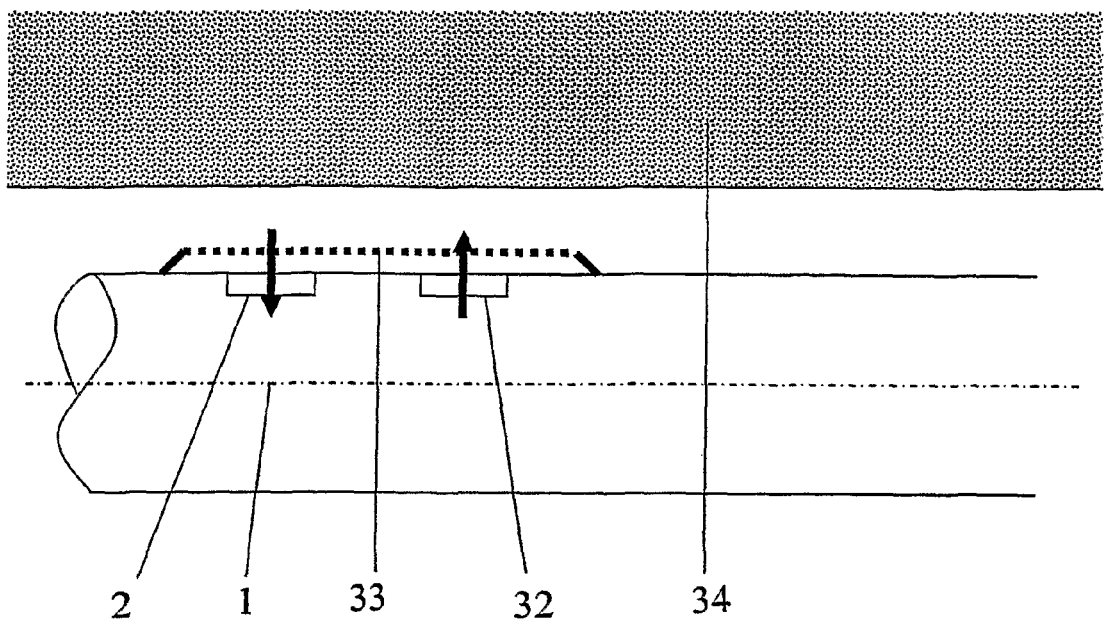
Figure 9B:
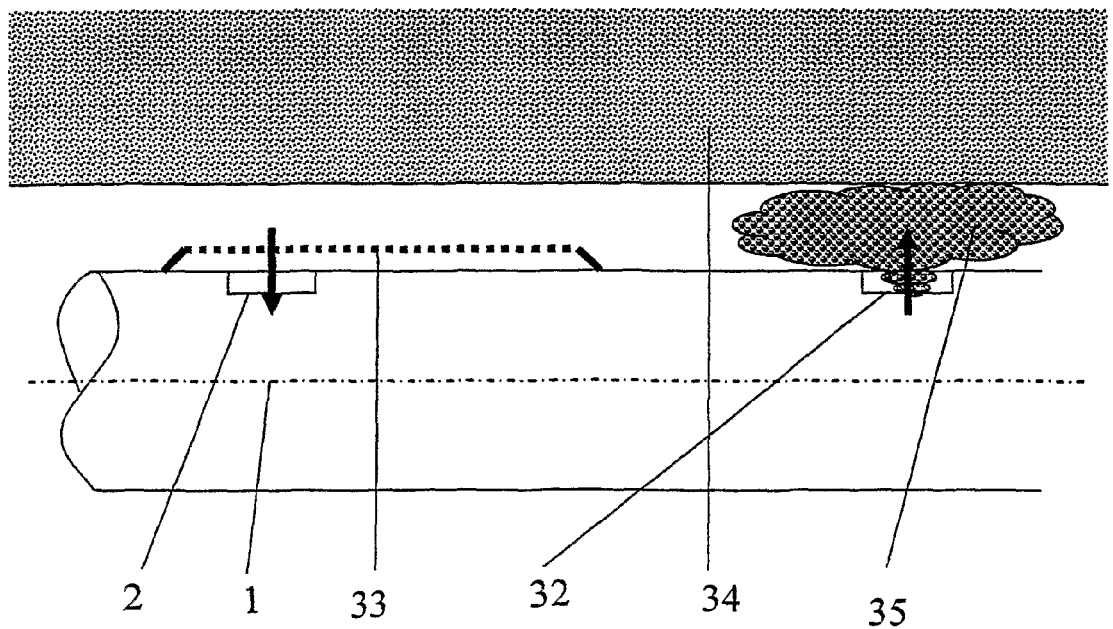
Figure 10:
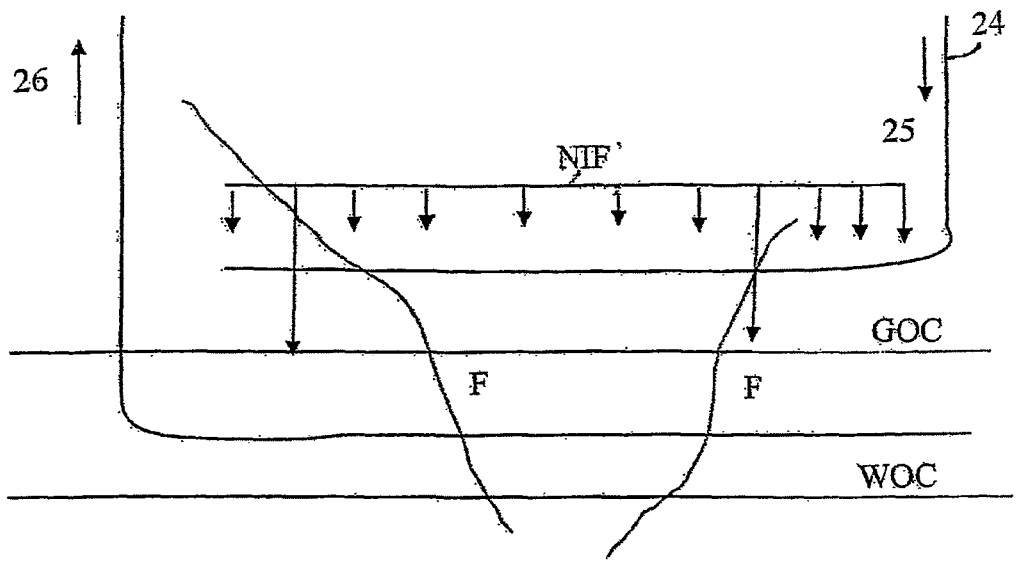
Figure 11:
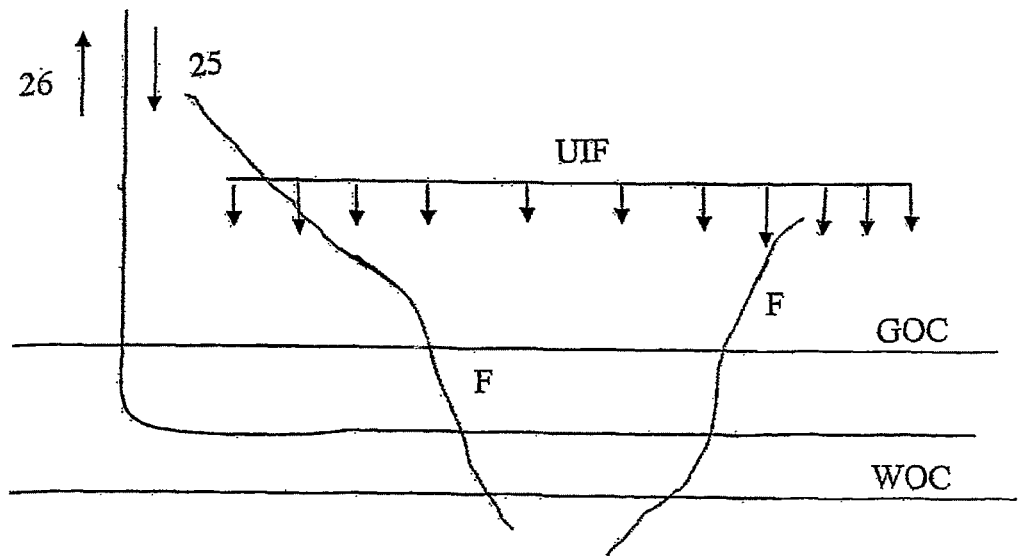
Figure 12:
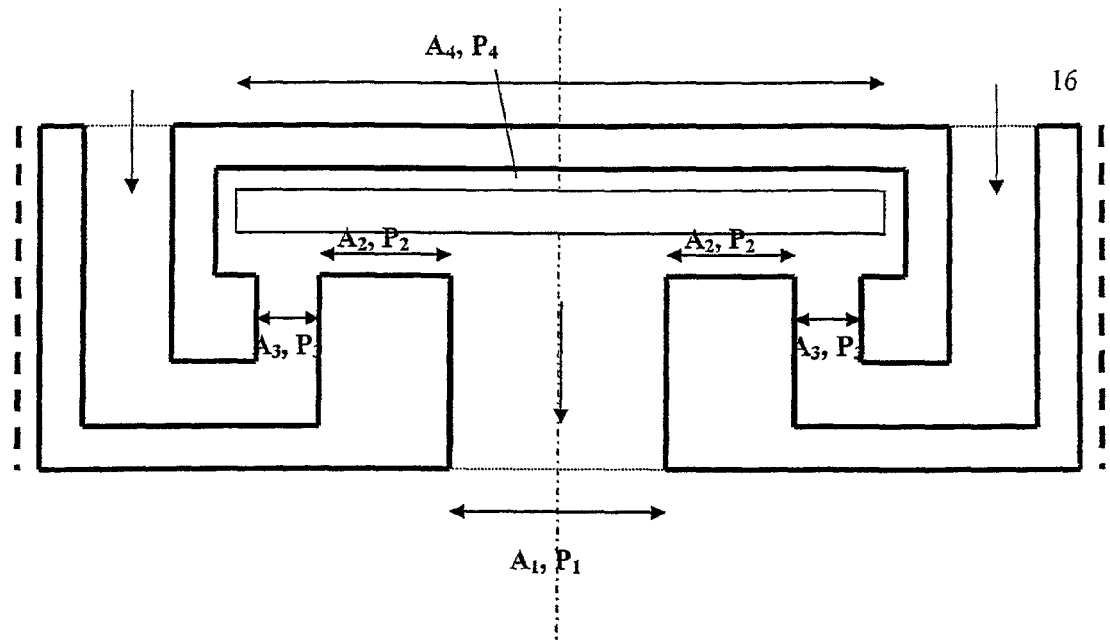

FIG. 9a-b shows two different embodiments of the present inventions, in which the control device according to WO-A1-2008/004875 situated in an inverted position to be used during injection into the formation;

FIG. 10 shows a typical injection profile in a reservoir with fractures by means of conventional technology;

FIG. 11 shows a typical injection profile in a reservoir with fractures using the present invention; and FIG. 12 shows a schematical representation to explain how the present valve or control device function as a check or nonreturn valve to prevent inverted flow theretrough.

The present invention is based on the valve or flow control device, control device hereinafter, disclosed by WO-A1-2008/004875 and, therefore, it is considered appropriately to give a comprehensive review of the same control device. Although the tubular member according to WO-A1-2008/004875 is said to be a production pipe and illustrated extending in a horizontal direction, these indications are not limitations but only examples. Thus, the present tubular element can be any suitable pipe, e.g. a branch pipe, and orientated in any direction such as vertical, deviated, etc. In addition to oil and gas, other fluids can be produced such as bitumen, for instance.

The number of control devices along the length of such a tubular element must be adapted to the needs in the respective well. Each control device is not necessarily grouped at the same peripheral levels but can be displaced to one another in an adequate manner. In WO-A1-2008/004875 reference is made to a freely movable and preferably flat disc or body provided in an open space formed between first and second disc-shaped housing and holder bodies. Apart from also having a partly conical or semicircular configuration, the freely movable disc or body can have the shape of a cone, hemisphere or combination of different configurations provided the housing and holder bodies have been correspondingly adjusted.

Figure 1:
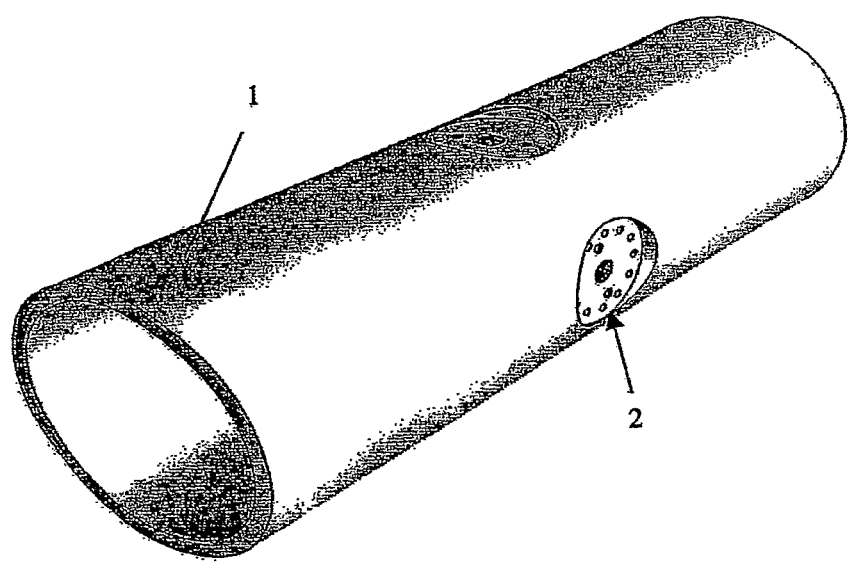

FIG. 1 shows schematically a drainage section of a production pipe 1 including control devices 2 according to WO-A1-2008/004875. Preferentially, the control device 2 is of circular, relatively flat shape and provided with external threads 3, see FIG. 2, to be screwed into a circular hole with corresponding internal threads in the pipe. By controlling the thickness, the device 2 can be adapted to the thickness of the pipe and fit within the outer and inner periphery thereof.

Figure 2:
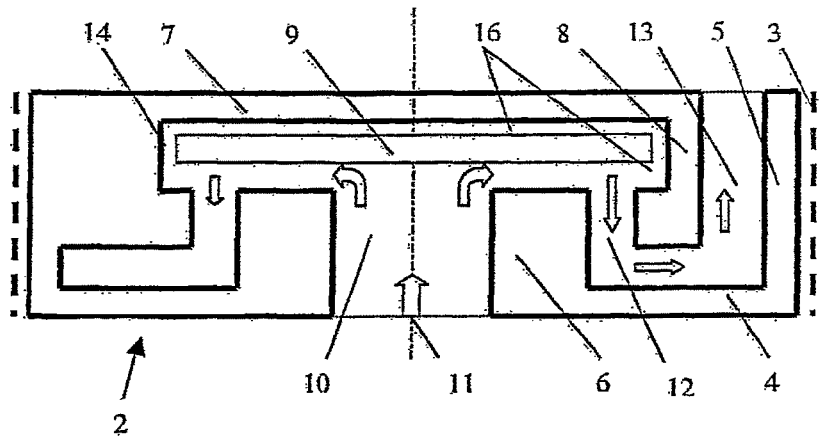
Figure 2:
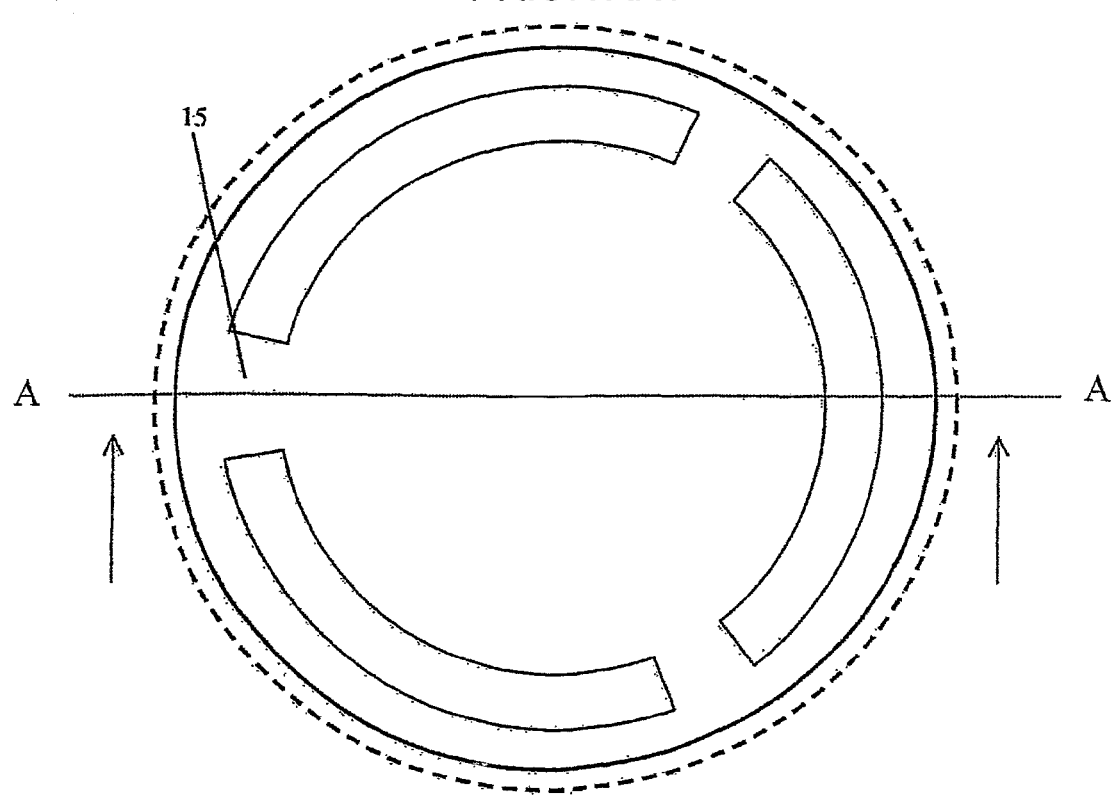

FIG. 2a-b shows the same control device 2 in larger scale. The device consists of a first disc-shaped housing body 4 with an outer cylindrical segment 5 and inner cylindrical segment 6 and with a central hole or aperture 10, and a second disc-shaped holder body 7 with an outer cylindrical segment 8, as well as a freely movable and preferably flat disc or body 9 arranged in an open space 14 formed between the first and second disc-shaped housing and holder bodies 4, 7. The body 9 can for particular applications and adjustments depart from the flat shape and have a partly conical or semicircular shape, for instance towards the aperture 10. As seen in FIG. 2, the cylindrical segment 8 of the second disc-shaped holder body 7 fits within and protrudes in the opposite direction of the outer cylindrical segment 5 of the first disc-shaped housing body 4 thereby forming a flow path as shown by the arrows 11, where the fluid enters the control device through the central hole or aperture 10, i.e. the inlet and flows towards and radially along the disc 9 before flowing through the annular opening 12 formed between the cylindrical segments 8 and 6 and further out through the annular opening 13 formed between the cylindrical segments 8 and 5. The two disc-shaped housing and holder bodies 4, 7 are attached to one another by a screw connection, welding or other means, not further depicted in the figures, at a connection area 15, see in FIG. 2b.

The control device exploits the effect of Bernoulli teaching that the sum of static pressure, dynamic pressure and friction is constant along a flow line:

$$p_{static} + \frac{1}{2}\rho v^2 + \Delta p_{friction}$$

When subjecting the disc 9 to a fluid flow, which is the case with the present control device, the pressure difference over the disc 9 can be expressed as follows:

$$\Delta p_{over} = \left[p_{over(P_4)} - p_{under(f(p_1,p_2,p_3))}\right] = \frac{1}{2}\rho v^2$$

Due to lower viscosity, a fluid such as gas will "make the turn later" and follow further along the disc towards its outer end 14. This makes a higher stagnation pressure in the area 16 at the end of the disc 9, which in turn makes a higher pressure over the disc. The disc 9 being freely movable within the space between the disc-shaped bodies 4, 7 will move downwards and thereby narrow the flow path between the disc 9 and inner cylindrical segment 6. Thus, the disc 9 moves downwards or upwards, depending on the viscosity of the fluid flowing through, whereby this principle can be used to control i.e. close or open the flow of fluid through of the control device.

Further, the pressure drop through a traditional inflow control device (ICD) with fixed geometry will be proportional to the dynamic pressure:

$$\Delta p = K \cdot \frac{1}{2}\rho v^2$$

where the constant, K is mainly a function of the geometry and less dependent on the Reynolds number.

Figure 3:
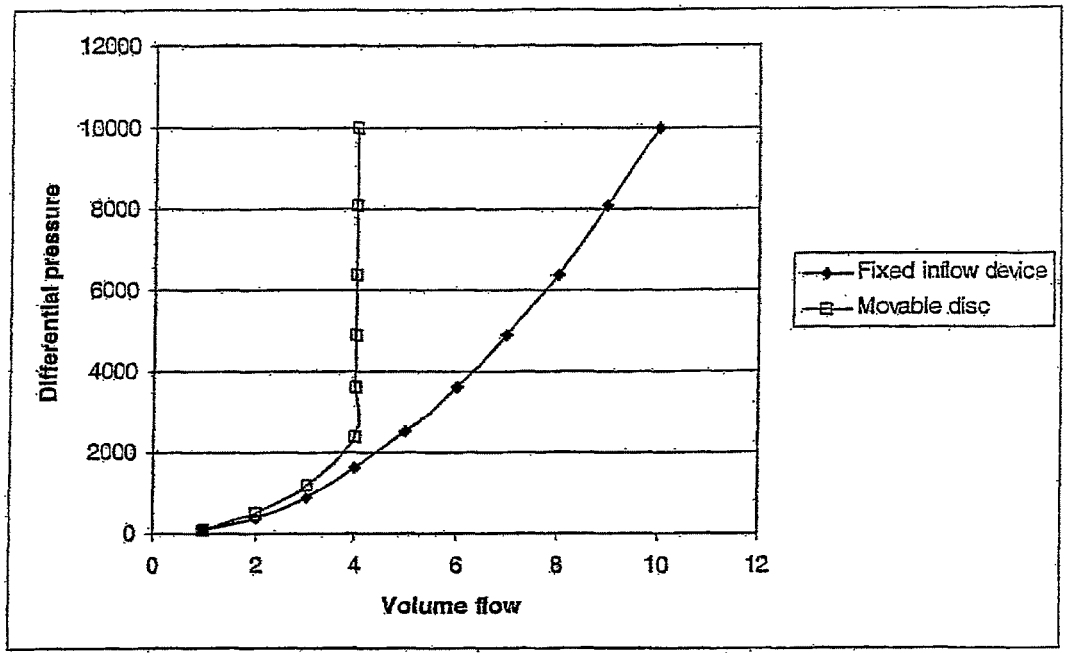
FIG. 3 is a diagram showing the flow volume through a control device according to FIG. 1 vs. the differential pressure in comparison with a fixed inflow device.

In the control device according to WO-A1-2008/004875 the flow area will decrease when the differential pressure increases, such that the volume flowing through the control device will not, or nearly not, increase when the pressure drop increases. A comparison between such a control device having movable disc and a control device with fixed flow-through opening is shown in FIG. 3 and, as illustrated., the flow-through volume for the present control device is constant above a given differential pressure. This represents a major advantage allowing the same volume to be flowed through each section for the entire horizontal well, which is not possible with fixed inflow control devices.

Figure 4:
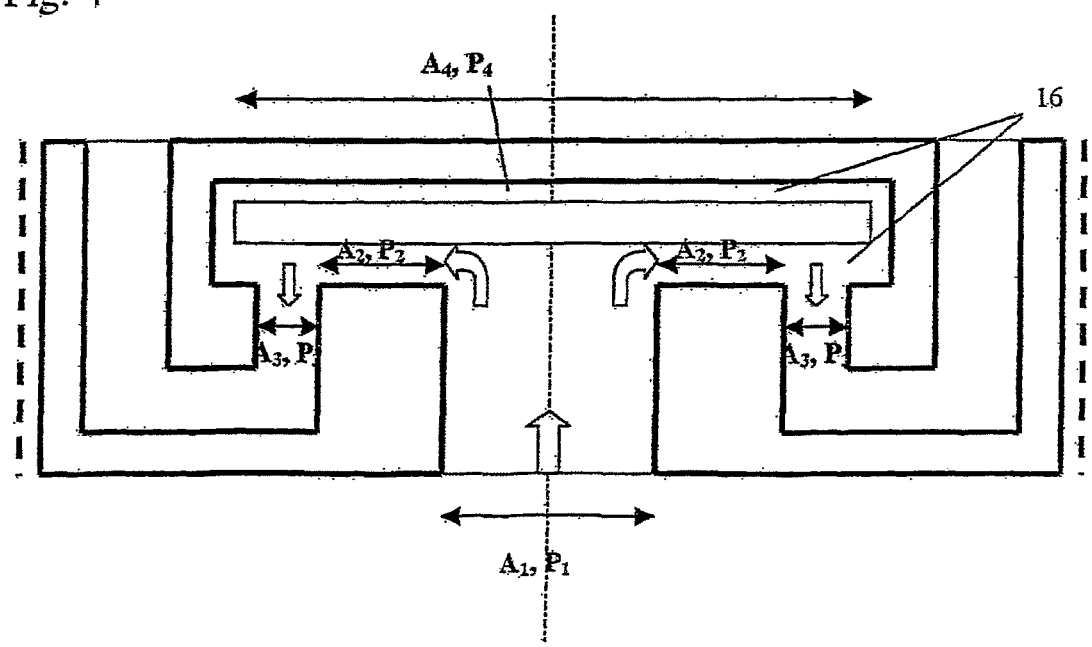
FIG. 4 shows the device in FIG. 2 but with the indication of different pressure zones influencing the design of the control device for different applications.

When producing oil and gas the control device can have two different applications: Using it as inflow control device to reduce inflow of water, or using it to reduce inflow of gas at gas break through situations. When designing the present control device for the different application such as water or gas, as mentioned above, the different areas and pressure zones, as shown in FIG. 4, will have impact on the efficiency and flow-through properties thereof. Referring to FIG. 4, the different area/pressure zones can be divided into:

$A_1$, $P_1$ is the inflow area and pressure respectively. The force, $P_1 \cdot A_1$, generated by this pressure will strive to open the control device, i.e. moves the disc or body 9 upwards.

$A_2$, $P_2$ is the area and pressure in the zone where the velocity will be largest and hence represents a dynamic pressure source. The resulting force of the dynamic pressure will strive to close the control device moving the disc or body 9 downwards as the flow velocity increases.

$A_3$, $P_3$ is the area and pressure at the outlet. This should be the same as the well pressure, i.e. inlet pressure.

$A_4$, $P_4$ is the area and pressure, i.e. stagnation pressure, behind the movable disc or body 9. The stagnation pressure at position 16, see FIG. 2, creates the pressure and the force behind the body. This will strive to close the control device as to move the body downwards.

Fluids with different viscosities will provide different forces in each zone depending on the design of these zones. In order to optimize the efficiency and flow-through properties of the control device, the design of the areas will be different for different applications, e.g. flow of gas/oil or oil/water. Hence, for each application the areas needs to be carefully balanced and optimally designed taking into account the properties and physical conditions such as viscosity, temperature, pressure for each situation to be designed.

Figure 5:
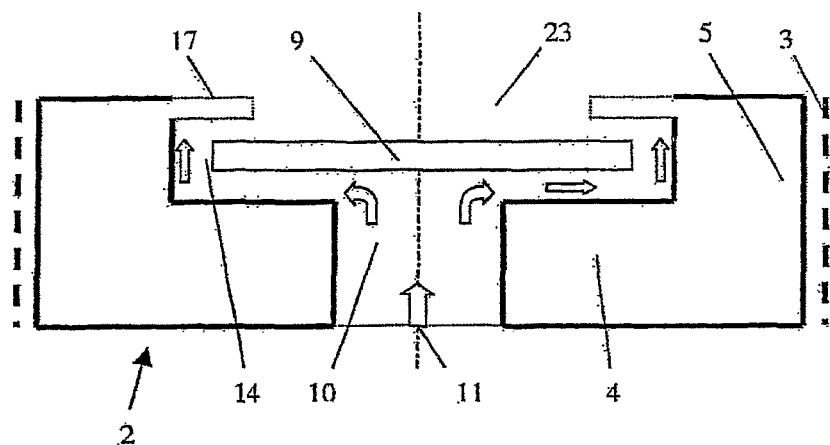
FIG. 5 shows a schematic representation of another embodiment of the control device according to WO-A1-2008/004875.

FIG. 5 shows a schematical representation of another embodiment of the control device according to WO-A1-2008/004875, which is of a more simple design than the version depicted in FIG. 2. The control device 2 consists, as with the version depicted in FIG. 2, of a first disc-shaped housing body 4 with an outer cylindrical segment 5 and with a central hole or aperture 10, and a second disc-shaped holder body 17 attached to the segment 5 of the housing body 4, as well as a preferably flat disc 9 provided in an open space 14 formed between the first and second disc-shaped housing and holder bodies 4, 17. However, since the second disc-shaped holder body 17 is inwardly open through a hole or holes 23, etc. and is now only holding the disc in place, and since the cylindrical segment 5 is shorter with a different flow path than what is shown in FIG. 2, there is no build up of stagnation pressure $P_4$ on the back side of the disc 9 as explained above in conjunction with FIG. 4. With this solution without stagnation pressure the building thickness for the device is lower and can withstand a larger amount of particles contained in the fluid.

Figure 6:
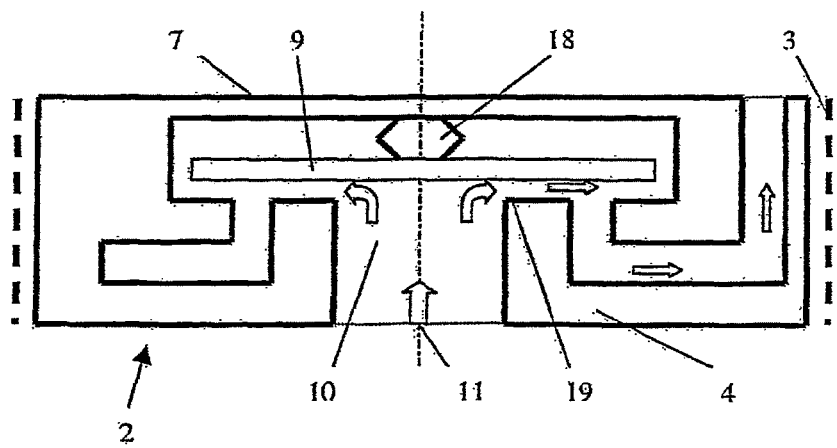
FIG. 6 shows a schematic representation of a third embodiment of the control device according to WO-A1-2008/004875.

FIG. 6 shows a third embodiment according to WO-A1-2008/004875 where the configuration is the same as with the example shown in FIG. 2 but in which a spring element 18, in the form of a spiral or other suitable spring device, is provided on either side of the disc and connects the disc with the holder 7, 22, recess 21 or housing 4.

The spring element 18 is used to balance and control the inflow area between the disc 9 and the inlet 10, or rather the surrounding edge or seat 19 of the inlet 10. Thus, depending on the spring constant and thereby the spring force, the opening between the disc 9 and edge 19 will be larger or smaller, and with a suitable selected spring constant, depending on the inflow and pressure conditions at the selected place where the control device is provided, constant mass flow through the device can be obtained.

Figure 7:
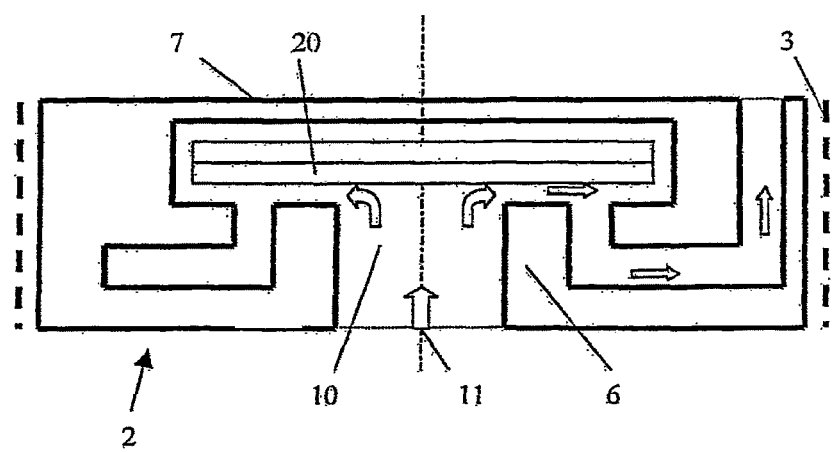
FIG. 7 shows a schematic representation of a fourth embodiment of the control device according to WO-A1-2008/004875.

FIG. 7 shows a fourth embodiment according to WO-A1-2008/004875 having a configuration as depicted in FIG. 6 above but in which the disc 9, on the side facing the inlet opening 10, is provided with a thermally responsive device such as bi-metallic element 20.

When producing oil and/or gas the conditions can rapidly change from a situation wherein only or mostly oil is produced to a situation wherein only or mostly gas is produced, i.e. break-through or coning of gas. With for instance a pressure drop of 16 bar from 100 bar the temperature drop would correspond to approximately 20° C. By providing the disc 9 with a thermally responsive element such as a bi-metallic element as shown in FIG. 7, the disc will bend upwards or be moved upwards by the element 20 abutting the holder shaped body 7 and thereby narrowing the opening between the disc and the inlet 10 or fully closing said inlet.

Figure 8:
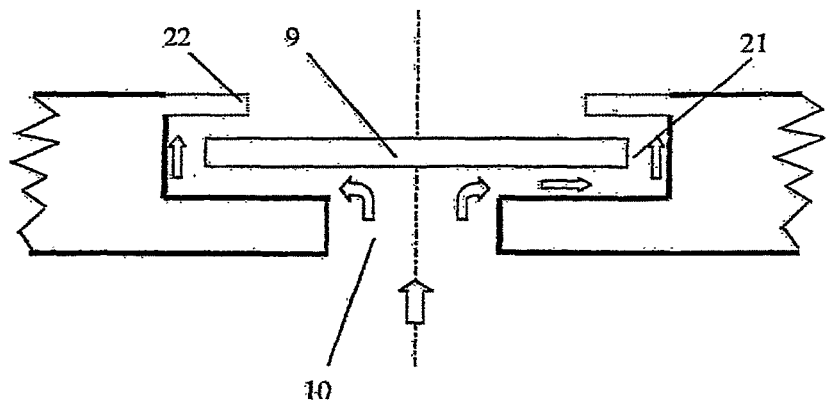
FIG. 8 shows a schematic representation of a fifth embodiment of WO-A1-2008/004875, in which the control device is an integral part of a flow arrangement.

As depicted in FIGS. 1 and 2 and 4-7, all of the examples are related to solutions in which the control device as such is a separate unit or apparatus to be provided in conjunction with a fluid flow situation or arrangement such as the wall of a production pipe in connection with the production of oil and gas. However, the control device can, as shown in FIG. 8, be an integral part of the fluid flow arrangement, whereby the movable body 9 can be provided in a recess 21 facing the outlet of an aperture or hole 10 of a wall of a pipe 1, for instance, and as illustrated in FIG. 1 instead of being provided in a separate housing body 4. Further, the movable body 9 can be held in place in the recess by means of appropriate means such as inwardly protruding spikes, a circular ring 22 or the like being connected to the outer opening of the recess by means of screwing, welding or the like.

To avoid the need of a separate well, when a fluid is to be injected in the subterranean formation 34, the present invention proposes the addition of a second plurality of valves or control devices 32 according to WO-A1-2008/004875 in supplement to the first plurality of such valves or control devices 2, see FIGS. 9a-b. Except being orientated in a direction opposite the first plurality, the additional second plurality of valves or control devices 32 are formed with a configuration corresponding to the valves or control devices 2 previously disclosed by WO-A1-2008/004875. Thus, the central hole or aperture 10, see FIGS. 2a and 4, will function as an outlet from the tubular member during injection of fluid into the reservoir.

As illustrated in FIGS. 9a-b, the additional valves or control devices 32 are arranged inside or outside screens 33, respectively. The number of additional valves or control devices 32 within each screen, e.g. a sand screen, is not necessarily equal to the number of first valves or control devices 2. By arranging the valves or control devices 32 outside the screen or screens 33, the fluid to be injected out of the drainage section or sections 1 can be swelling particles 35, for instance. It is understood that the second plurality of self-adjustable valves or control devices 32 can be provided in all or only in selected drainage sections 1 along the tubular member, thereby enabling controlled injection into the reservoir. The fluid to be injected into the subterranean formation 34 could be an acid, inhibitor, vapour, solvent, water, gases, e.g. hydrocarbon gas and $CO_2$, liquids, e.g. water, chemicals, swell particles, etc. or combinations of these.

FIGS. 10 and 11 show typical injection profiles in a reservoir with fractures F, using conventional technology and the present invention, respectively. In FIG. 11 a plurality of both valves or control devices 2, 32, not shown in the figure, are provided along the length of the drainage section of the pipe leading to a substantially uniform injection of the fluid as shown with the line of arrows (ULF) of almost equal length. Contrary, the conventional injection technology shown in FIG. 10 using a separate injection pipe 24 leads to a non-uniform injection of fluid (NIF), especially in the fractures F in which the injected fluid makes a shortcut, as also mentioned in the introductionary part of the description. In both FIGS. 10 and 11 the production pipe is the same, and the flow directions in the production pipe are indicated with arrows 25 and 26 during production or injection, respectively. In both FIGS. 10 and 11, two lines indicating gas-oil contact (GOC) and water-oil contact (WOC) are further shown.

With reference to FIG. 12 a brief explanation is given to illustrate how the present control device functions as a check or nonreturn valve to prevent reversed flow during production and injection, respectively.

$A_3$, $P_3$ is the inlet pressure for reversed flow. This pressure is the highest and will try to open the control device. $P_4$ will be the same as $P_3$. This pressure will strive to close the valve. $A_2$, $P_2$ is the area and pressure in the zone where the velocity will be largest and the pressure drop occur. This pressure will strive to close the valve due to the Bernoulli effect. $A_1$, $P_1$ is the outflow area and pressure for reversed flow. This will be the lowest pressure and strive to close the valve for back-flow.

Hence, all pressures will strive to close the valve, except for $P_3$. Since the area $A_3$ is relatively small, compared to the other areas, the total force balance will close the valve.

With the present invention, due to the constant volume rate, a much better drainage of the reservoir is thus achieved. This result in significant larger production of the reservoir. At the same time the required amount of injected fluids can be reduced significantly. This is important e.g. in bitumen production where steam is injected.

Further, due to the flow characteristic of the control device, the injection along the different section of the well will be substantially uniform. This is ensured by the unique constant volume rate from the control device 32, even for non-uniform reservoirs in which the pressure drop will vary.

The invention claimed is:

1. A tubular member having at least one drainage section including a first plurality of self-adjustable valves or flow control devices to control the flow of fluid into the drainage section from a well formed in a subterranean reservoir, each of the valves or control devices comprising an inlet or aperture, thereby forming a flow path through the valve or control device passing by a movable disc or body which is designed to move freely relative to the opening of the inlet and thereby reduce or increase the flow-through area by exploiting the Bernoulli effect and any stagnation pressure created over the disc, whereby the valve or control device, depending on the composition of the fluid and its properties, autonomously adjusts the flow of the fluid based on a pre-estimated flow design, wherein a second plurality of such self-adjustable valves or control devices is provided in the drainage section, each such additional valves or control devices being situated in a direction opposite of the first plurality, thereby allowing injection of a fluid into the subterranean reservoir through the drainage section.

2. The tubular member according to claim 1, wherein at least one of the valves or control devices of the first and second pluralities is arranged inside a screen.

3. The tubular member according to claim 2, wherein the second plurality of self-adjustable valves or control devices is only provided in selected drainage sections of the tubular member.

4. The tubular member according to claim 2, wherein the fluid injected into the subterranean reservoir is an acid, inhibitor, vapour, solvent, gases, liquids, chemicals, swell particles, etc. or combinations of these.

5. The tubular member according to claim 2, wherein each of the valves or control devices consists of a first disc-shaped body with an outer cylindrical segment and inner cylindrical segment and with the central aperture, and a second disc-shaped body with an outer cylindrical segment, as well as a basically flat disc provided between the first and second disc-shaped bodies, whereby the cylindrical segment of the second disc-shaped body fits within and protrudes in the opposite direction of the outer cylindrical segment of the first disc-shaped body, thereby forming the flow path where the fluid enters the valve or control device through the central aperture or inlet flowing towards and along the disc before flowing through an annular opening formed between the cylindrical segments and further out through the annular opening formed between the cylindrical segments.

6. The tubular member according to claim 1, wherein the valves or control devices of the second plurality are arranged outside the screens.

7. The tubular member according to claim 6, wherein the second plurality of self-adjustable valves or control devices is only provided in selected drainage sections of the tubular member.

8. The tubular member according to claim 6, wherein the fluid injected into the subterranean reservoir is an acid, inhibitor, vapour, solvent, gases, liquids, chemicals, swell particles, etc., or combinations of these.

9. The tubular member according to claim 6, wherein each of the valves or control devices consists of a first disc-shaped body with an outer cylindrical segment and inner cylindrical segment and with the central aperture, and a second disc-shaped body with an outer cylindrical segment, as well as a basically flat disc provided between the first and second disc-shaped bodies, whereby the cylindrical segment of the second disc-shaped body fits within and protrudes in the opposite direction of the outer cylindrical segment of the first disc-shaped body, thereby forming the flow path where the fluid enters the valve or control device through the central aperture or inlet flowing towards and along the disc before flowing through an annular opening formed between the cylindrical segments and further out through the annular opening formed between the cylindrical segments.

10. The tubular member according to claim 1, wherein the second plurality of self-adjustable valves or control devices is only provided in selected drainage sections of the tubular member.

11. The tubular member according to claim 10, wherein the fluid injected into the subterranean reservoir is an acid, inhibitor, vapour, solvent, gases, liquids, chemicals, swell particles, etc. or combinations of these.

12. The tubular member according to claim 10, wherein each of the valves or control devices consists of a first disc-shaped body with an outer cylindrical segment and inner cylindrical segment and with the central aperture, and a second disc-shaped body with an outer cylindrical segment, as well as a basically flat disc provided between the first and second discshaped bodies, whereby the cylindrical segment of the second disc-shaped body fits within and protrudes in the opposite direction of the outer cylindrical segment of the first disc-shaped body, thereby forming the flow path where the fluid enters the valve or control device through the central aperture or inlet flowing towards and along the disc before flowing through an annular opening formed between the cylindrical segments and further out through the annular opening formed between the cylindrical segments.

13. The tubular member according to claim 1, wherein the fluid injected into the subterranean reservoir is an acid, inhibitor, vapour, solvent, gases, liquids, chemicals, swell particles, etc. or combinations of these.

14. The tubular member according to claim 13, wherein each of the valves or control devices consists of a first disc-shaped body with an outer cylindrical segment and inner cylindrical segment and with the central aperture, and a second disc-shaped body with an outer cylindrical segment, as well as a basically flat disc provided between the first and second discshaped bodies, whereby the cylindrical segment of the second disc-shaped body fits within and protrudes in the opposite direction of the outer cylindrical segment of the first disc-shaped body, thereby forming the flow path where the fluid enters the valve or control device through the central aperture or inlet flowing towards and along the disc before flowing through an annular opening formed between the cylindrical segments and further out through the annular opening formed between the cylindrical segments.

15. The tubular member according to claim 1, wherein each of the valves or control devices consists of a first disc-shaped body with an outer cylindrical segment and inner cylindrical segment and with the central aperture, and a second disc-shaped body with an outer cylindrical segment, as well as a basically flat disc provided between the first and second disc-shaped bodies, whereby the cylindrical segment of the second disc-shaped body fits within and protrudes in the opposite direction of the outer cylindrical segment of the first disc-shaped body, thereby forming the flow path where the fluid enters the valve or control device through the central aperture or inlet flowing towards and along the disc before flowing through an annular opening formed between the cylindrical segments and further out through the annular opening formed between the cylindrical segments.

16. The tubular member according to claim 15, wherein a spring is provided between a side of the disc and connects the disc with a holder, recess or housing.

17. The tubular member according to claim 16, wherein the thermally responsive device is a bi-metallic element.

18. The tubular member according to claim 15, wherein the disc on the side facing the aperture is provided with a thermally responsive device.

* * * * *

UNITED STATES PATENT AND TRADEMARK OFFICE
CERTIFICATE OF CORRECTION

PATENT NO.         : 8,517,099 B2
APPLICATION NO. : 12/920020
DATED              : August 27, 2013
INVENTOR(S)        : Mathiesen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 353 days.

Signed and Sealed this

Fifteenth Day of September, 2015

Michelle K. Lee
*Director of the United States Patent and Trademark Office*